United States Patent
O'Hagan

(10) Patent No.: US 12,462,662 B2
(45) Date of Patent: Nov. 4, 2025

(54) RADIO FREQUENCY PROXIMITY DETECTION DEVICES

(71) Applicant: ZEBRA TECHNOLOGIES CORPORATION, Lincolnshire, IL (US)

(72) Inventor: James J. O'Hagan, McHenry, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 449 days.

(21) Appl. No.: 17/989,188

(22) Filed: Nov. 17, 2022

(65) Prior Publication Data

US 2024/0169820 A1 May 23, 2024

(51) Int. Cl.
*G08B 21/18* (2006.01)
*G06K 7/10* (2006.01)

(52) U.S. Cl.
CPC .............. *G08B 21/182* (2013.01); *G06K 7/10* (2013.01)

(58) Field of Classification Search
CPC .. G08B 21/182; G08B 13/1427; G08B 21/24; G06K 7/10
See application file for complete search history.

(56) References Cited

U.S. PATENT DOCUMENTS

| | | | | |
|---|---|---|---|---|
| 6,076,007 A | * | 6/2000 | England | G01V 15/00 128/899 |
| 6,980,100 B1 | * | 12/2005 | Hammond | G08B 26/007 340/505 |
| 7,023,356 B2 | * | 4/2006 | Burkhardt | G08B 21/0222 340/8.1 |
| 7,411,551 B2 | * | 8/2008 | Choi | G01S 13/878 342/465 |
| 7,605,688 B1 | * | 10/2009 | Seah | G01S 13/91 340/972 |
| 7,843,350 B2 | * | 11/2010 | Geissler | A01K 11/006 340/573.2 |
| 8,207,820 B2 | * | 6/2012 | Bauchot | H04Q 9/00 700/226 |
| 8,851,386 B2 | * | 10/2014 | Phillips | H05K 9/002 235/451 |
| 9,135,477 B2 | | 9/2015 | Stern et al. | |
| 9,373,237 B1 | * | 6/2016 | Hoehn | G06Q 10/087 |
| 10,061,933 B1 | * | 8/2018 | Myers | G06F 21/572 |
| 11,506,777 B2 | * | 11/2022 | Li | G01S 13/878 |
| 2004/0036575 A1 | * | 2/2004 | Patterson | G06K 7/0008 340/10.2 |
| 2006/0038676 A1 | * | 2/2006 | Richards | G08B 21/0227 340/539.23 |
| 2006/0066148 A1 | * | 3/2006 | Nguyen | G08B 21/22 340/5.2 |

(Continued)

*Primary Examiner* — Curtis J King

(57) ABSTRACT

A method includes: transmitting, by a first radio frequency transceiver of a first device, a first signal; receiving, by the first radio frequency transceiver of the first device, a second signal in response to the first signal; determining a time value associated with the receiving of the second signal; determining that at least one of the time value or a distance value determined using the time value is less than or equal to a first threshold value, wherein the first threshold value is associated with the first device; and triggering a first output by a user interface component of the first device based on at least one of the time value or the distance value being less than or equal to the first threshold value.

3 Claims, 7 Drawing Sheets

(56) References Cited

U.S. PATENT DOCUMENTS

| | | | |
|---|---|---|---|
| 2006/0078103 A1* | 4/2006 | Light | H04Q 11/0421 379/201.02 |
| 2006/0114104 A1* | 6/2006 | Scaramozzino | G06K 7/0008 340/10.2 |
| 2006/0140374 A1* | 6/2006 | Light | H04L 63/10 379/201.01 |
| 2006/0176177 A1* | 8/2006 | Heinze | G08B 25/007 340/8.1 |
| 2006/0193456 A1* | 8/2006 | Light | G07C 9/27 379/21 |
| 2006/0241396 A1* | 10/2006 | Fabian | A61B 5/06 340/572.1 |
| 2006/0241399 A1* | 10/2006 | Fabian | A61B 5/061 600/424 |
| 2007/0052540 A1* | 3/2007 | Hall | G06K 7/10108 340/572.1 |
| 2007/0115125 A1* | 5/2007 | Lyon | G06K 7/0008 340/572.1 |
| 2007/0188342 A1* | 8/2007 | Valeriano | G06K 17/00 340/8.1 |
| 2007/0222603 A1* | 9/2007 | Lai | G06K 7/0008 340/572.7 |
| 2007/0241904 A1* | 10/2007 | Ozaki | G01S 13/84 340/572.1 |
| 2007/0285245 A1* | 12/2007 | Djuric | G08B 21/0275 340/573.1 |
| 2008/0001763 A1* | 1/2008 | Raja | G08B 21/245 340/572.1 |
| 2008/0074238 A1* | 3/2008 | Kodialam | H04L 43/0882 340/10.2 |
| 2008/0111688 A1* | 5/2008 | Nikitin | G06K 7/10217 340/572.1 |
| 2008/0129457 A1* | 6/2008 | Ritter | G07C 9/257 340/10.1 |
| 2008/0143482 A1* | 6/2008 | Shoarinejad | G01S 7/003 340/8.1 |
| 2008/0266098 A1* | 10/2008 | Aiouaz | H04W 52/16 340/572.1 |
| 2008/0297323 A1* | 12/2008 | Barkan | G08C 23/04 340/10.31 |
| 2008/0309463 A1* | 12/2008 | Godzwon | G06K 7/10019 340/10.1 |
| 2009/0002165 A1* | 1/2009 | Tuttle | G08B 13/2474 340/572.1 |
| 2009/0085738 A1* | 4/2009 | Darianian | G06K 17/0022 340/572.1 |
| 2009/0210940 A1* | 8/2009 | Dean | G06K 7/10366 726/19 |
| 2009/0267747 A1* | 10/2009 | Rivest | G06K 7/10019 340/10.2 |
| 2009/0309704 A1* | 12/2009 | Chang | H04Q 9/00 340/10.1 |
| 2010/0007496 A1* | 1/2010 | Orlassino | H04W 4/02 340/572.1 |
| 2010/0039230 A1* | 2/2010 | Voutilainen | H04B 17/21 340/10.1 |
| 2010/0148965 A1* | 6/2010 | Alexis | G06K 19/0723 340/572.1 |
| 2010/0156640 A1* | 6/2010 | Forster | G06K 7/1097 340/572.1 |
| 2010/0188211 A1* | 7/2010 | Brommer | G06K 19/0675 340/539.32 |
| 2010/0201488 A1* | 8/2010 | Stern | G06K 7/0008 340/10.1 |
| 2010/0231357 A1* | 9/2010 | Hong | G06K 7/10316 340/10.1 |
| 2010/0231387 A1* | 9/2010 | Hong | G06K 7/10346 340/541 |
| 2011/0095892 A1* | 4/2011 | Hong | A47F 9/04 340/572.7 |
| 2011/0248852 A1* | 10/2011 | Falk | H04L 63/0428 340/572.1 |
| 2011/0316675 A1* | 12/2011 | Tsujimoto | G06K 7/10217 340/10.4 |
| 2012/0044074 A1* | 2/2012 | Mulla | G08B 13/2448 340/572.1 |
| 2012/0075101 A1* | 3/2012 | Austin | G01P 13/00 340/572.1 |
| 2012/0119883 A1* | 5/2012 | Bekritsky | G06K 7/10356 340/10.5 |
| 2012/0176227 A1* | 7/2012 | Nikitin | G06K 7/10019 340/10.2 |
| 2013/0099919 A1* | 4/2013 | Cai | G08B 7/066 340/539.13 |
| 2013/0120119 A1* | 5/2013 | Calvarese | G06K 7/10217 340/10.5 |
| 2013/0234832 A1* | 9/2013 | Manzi | G06K 7/0008 340/10.2 |
| 2015/0332072 A1* | 11/2015 | Herrick | H04Q 5/22 340/10.3 |
| 2015/0363617 A1* | 12/2015 | Honore | G06K 7/10366 340/10.6 |
| 2016/0055316 A1* | 2/2016 | Jafari | G16H 20/10 340/573.1 |
| 2016/0075189 A1* | 3/2016 | Engel | G06K 7/10366 340/438 |
| 2016/0088432 A1* | 3/2016 | Myers | G06F 21/34 340/5.2 |
| 2016/0180669 A1* | 6/2016 | Bradshaw | G08B 13/2448 340/572.1 |
| 2016/0180674 A1* | 6/2016 | Hoehn | G08B 13/2402 340/572.1 |
| 2016/0377698 A1* | 12/2016 | Nielsen | G06T 7/292 342/450 |
| 2016/0379074 A1* | 12/2016 | Nielsen | G01S 19/485 348/143 |
| 2017/0135063 A1* | 5/2017 | Bartov | G01S 13/765 |
| 2017/0263105 A1* | 9/2017 | Shoari | G01S 5/12 |
| 2017/0353847 A1* | 12/2017 | Coulis | B25F 5/00 |
| 2018/0027203 A1* | 1/2018 | Clay | H04N 21/42204 348/734 |
| 2018/0356514 A1* | 12/2018 | Lakamraju | G01S 5/0289 |
| 2019/0156272 A1* | 5/2019 | Douglas | G06Q 20/208 |
| 2019/0213884 A1* | 7/2019 | Kim | G01S 17/931 |
| 2019/0265327 A1* | 8/2019 | Bennison | G01S 7/4817 |
| 2020/0337162 A1* | 10/2020 | Perkins | G04G 17/04 |
| 2020/0374672 A1* | 11/2020 | Tennill | G06Q 10/087 |
| 2020/0393555 A1* | 12/2020 | Kletsov | G01S 13/751 |
| 2021/0165977 A1* | 6/2021 | Cheng | H04W 4/029 |
| 2021/0190939 A1* | 6/2021 | Kim | G01S 1/44 |
| 2021/0231815 A1* | 7/2021 | Hunnicutt | H04W 4/029 |
| 2021/0258725 A1* | 8/2021 | Shoari | H04W 68/02 |
| 2021/0396835 A1* | 12/2021 | Veres | G01S 5/0009 |
| 2022/0006892 A1* | 1/2022 | Perkins | H01R 4/28 |
| 2022/0272773 A1* | 8/2022 | Coulis | H04W 76/10 |
| 2023/0226409 A1* | 7/2023 | Smith | G01S 7/006 348/169 |
| 2023/0289552 A1* | 9/2023 | Samardzija | H01Q 1/2291 |
| 2024/0219559 A1* | 7/2024 | Shin | H04W 4/023 |
| 2025/0081141 A1* | 3/2025 | Reddy | G01S 13/765 |

* cited by examiner

RADIO FREQUENCY PROXIMITY DETECTION DEVICES

BACKGROUND

In many settings, it may be desirable to find a particular object from among other objects. However, finding a specific package, or other item, from among a large number of boxes may be a time consuming endeavor. Inventory management and object location systems employ a variety of techniques and strategies to find objects. Examples include searching for a radio frequency identification (RFID) tag using a mobile device based on received signal strength indicator (RSSI) from the tag, barcoding shelf locations (e.g., in a warehouse or retail store), color coding of labels, use of active, powered locator devices, computer vision, etc. However, such techniques may have limitations in terms of performance and cost.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
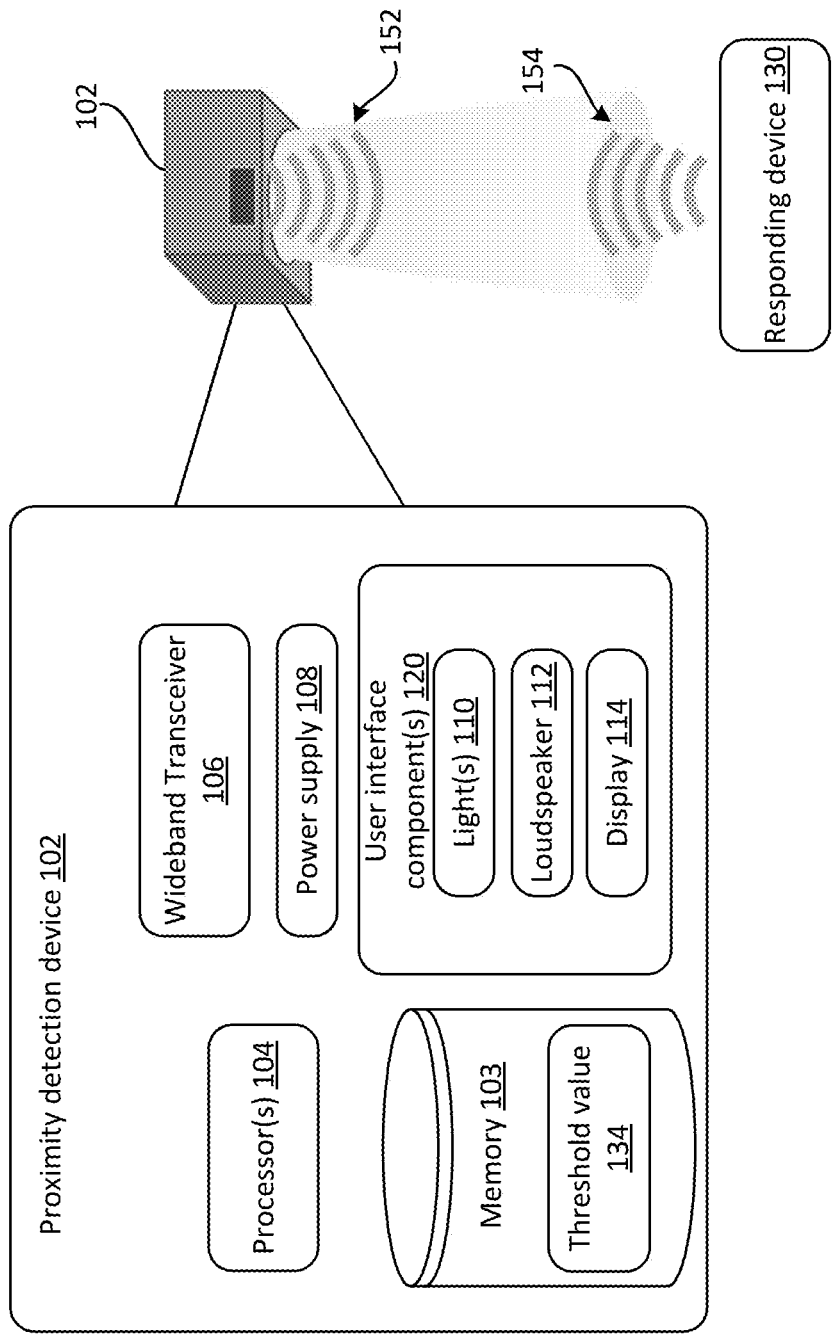
FIG. 1 is a diagram of a proximity detection device, in accordance with various aspects of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a device comprising: at least one first processor; a first radio frequency transceiver; and a user interface component; the first radio frequency transceiver configured to: transmit a first signal; and receive a second signal from a remote device in response to the first signal; the at least one first processor configured to: determine a time value associated with the receiving of the second signal; determine that at least one of the time value or a distance value determined using the time value is less than or equal to a first threshold value, wherein the first threshold value is associated with the device; and trigger a first output by the user interface component based on at least one of the time value or the distance value being less than or equal to the first threshold value.

Additional examples disclosed herein are directed to a method comprising: transmitting, by a first radio frequency transceiver of a first device, a first signal; receiving, by the first radio frequency transceiver of the first device, a second signal in response to the first signal; determining a time value associated with the receiving of the second signal; determining that at least one of the time value or a distance value determined using the time value is less than or equal to a first threshold value, wherein the first threshold value is associated with the first device; and triggering a first output by a user interface component of the first device based on at least one of the time value or the distance value being less than or equal to the first threshold value.

There are many contexts in which it may be advantageous to know the approximate position of an object-of-interest. For example, a "last mile" delivery vehicle may store hundreds of packages, each of which may have a different delivery destination. Accordingly, it may be advantageous to know the approximate location of a particular package within the vehicle so that a delivery associate may quickly find the package to complete the delivery in a time efficient manner. In another example, a container of produce may have equipment that is used to monitor the temperature of the container during transit to ensure that the produce is kept at or below a threshold temperature. If the temperature of the container rises above the threshold, it may be advantageous to quickly find the container (from among other similar containers, for example) so that remedial action may be taken before the produce spoils. In another example, it may be advantageous to identify the appropriate shelf location to store inbound inventory. In another example, it may be useful to be able to quickly find a particular piece of luggage in a luggage holding area. The foregoing examples are just a few of many possible scenarios in which it may be useful to know the approximate position of an object-of-interest.

Existing object location systems and techniques may include use of passive RFID tags on objects and then searching for a unique identifier (UID) of an RFID tag (e.g., a tag on an object-of-interest) using a mobile RFID reader, determining a location of the reader, then determining a location of the RFID tag based on the location of the reader and the strength of a signal (RSSI) received by the reader from the RFID tag. However, RSSI may not be an accurate indicator of range, and while this technique may be effective over limited ranges, it may be of limited usefulness in a large warehouse (or other large-area setting) where the tag-of-interest may be far away from the scanning device. Another object location technique may include barcoding or labeling shelves and then scanning both a label on the object and the label positioned where the object is stored. However, objects may be moved without updating the location data either by personnel or by a load shifting (e.g., when the object is on a vehicle in transit). Active beacons and tracking systems (e.g., global positioning system (GPS) devices or active RFID beacons) may provide accurate location information, but such active, powered systems may be cost-prohibitive in large-scale operations (e.g., where thousands or even millions of objects may be tracked). Additionally, other real time location services (RTLS) infrastructure may be used, but such infrastructure requires careful installation and/or calibration to ensure precise location information. In addition to being expensive and difficult to maintain, such systems may be excessive if only proximity information is needed (rather than location information). Similarly, computer vision may be used to track objects, but such systems often require expensive camera systems and/or back-end compute support.

Described herein are radio frequency (RF) proximity detection devices that may be used to detect proximate objects-of-interest. The proximity detection devices may use existing infrastructures such as active, semi-passive, and/or passive RFID tags and/or any other device capable of reflecting and/or otherwise responding to RF signals transmitted by the proximity detection devices. The proximity detection devices and techniques described herein are low power devices that consume relatively little power and may be light weight in terms of compute and/or hardware requirements. As such, these devices may optionally be battery-powered and may be relatively inexpensive to manufacture and/or maintain such that they may be deployed at scale without requiring the devices to be wired into mains (although the proximity detection devices may additionally be implemented in "wired" embodiments and/or hybrid wired/battery-powered embodiments, as desired).

The term "narrowband" as used herein refers to a signal band that is not significantly wider than the bandwidth of the data and may refer to the type of signals and frequency ranges used in an RFID reader system. In some examples, narrowband may refer to an electromagnetic signal generated by a transmitter around the 860-960 MHz frequency range, such as signals compatible with EPCglobal Gen 2 standards and protocols or ISO/IEC 18000-6 standards and protocols which provide for communication and data exchange. The term "wideband" as used herein refers to generating a signal in a higher bandwidth than may be used in the lower band width interrogation ranges of an RFID reader system. In various examples, the wideband signal may be generated in an unlicensed frequency band, such as an electromagnetic signal generated by a transmitter around the 2.4 GHz range or the 6-7 GHz ultra-wideband range. The term "tag" and/or "RFID tag" refers to a physical medium used in a RFID system that includes at least one antenna and circuitry designed to be associated with an object to store and communicate data related to the object.

While there are many types of data signals that could be used in the various embodiments described herein, it may be desirable to use data signals that are already supported in existing systems in order to leverage existing infrastructure and/or to reduce costs of developing or producing devices. There are at least two standards which describe data and operating methods which may be used in communication between a narrowband reader and a passive or semi-passive RFID tag. These include: Standard 18000-6 by ISO/IEC (Information Technology Radio Frequency Identification for Item Management Part 6: Parameters for air interface communications at 860 MHz to 960 MHz) and Standard Class-1 Generation-2 by EPCglobal/GS-1 (EPC Radio Frequency Identity Protocols Class-1 Generation-2 UHF RFID Protocol for Communications at 860 MHz-960 MHz). Searching for a short sequence representing specific data or a change in communication state by the tag is one way for a wideband transceiver to recognize that a received signal has been backscatter reflected from a tag. There are also standards that describe air interface protocols and application program interfaces (API) for real-time locating systems (RTLS). This includes Standard 24730 by ISO/IEC—Information technology—Real-time locating systems (RTLS). Although the 24730 standard assumes an active tag transmitter is being used to create the locating signal, other aspects of this standard including some specific protocols and APIs of 24730 could also be used with the signal reflected from the tag using the various examples described herein.

An RFID tag may also be referred to as a transponder. As previously described, an RFID tag may be either active or passive, where an active RFID tag can have an independent source of power, such as a battery, while a passive RFID tag is typically powered by wireless radiation, such as an RF signal, emitted from a source device. The term "Semi-passive RFID tag" may be used to describe an RFID tag with a battery that operates as a backscattering passive RFID tag, using supplemental battery power to increase the power for transmitting the backscattered signal. While some examples described herein employ passive RFID tags or passive tags, the embodiments and operations could additionally or alternatively be performed using semi-passive RFID tags. As such, when "passive RFID tag" or "passive tag" is used herein, it is understood that the disclosed features and operations may also refer to a "semi-passive RFID tag." In addition, as described in further detail below, in some examples the various proximity detection techniques described herein may employ active data logger devices which may be powered devices that monitor an environment to generate log data. Such devices may include an antenna and circuitry effective to receive timing beacon pulse signals from proximity detection devices and selectively generate RF response signals upon the occurrence of a predefined event or condition, as described in further detail below.

A transmitter, such as an RFID reader, may transmit an RF signal that may energize a passive tag within its RF field, thereby activating the passive tag and enabling the tag to modulate the RF signal by switching its RF antennas to create a backscatter reflection target. This modulated signal returned from the passive RFID tag can provide data (such as a tag UID) from the RFID tag to an RFID reader. In some examples, the narrowband RFID reader may transmit an interrogation signal to passive RFID tags and listen for return signals reflected by the activated passive RFID tags.

The term "transceiver" as used herein refers to a device that may transmit and/or receive RF signals at various frequencies. A transceiver may be one of an RFID reader, interrogator, locator, illuminator, transponder or any other apparatus that may transmit and/or receive RF signals.

In some examples, a narrowband RF signal may be an interrogation signal that initiates backscatter modulation of the narrowband signal by a responding (e.g., reflecting) passive RFID tag. A narrowband RFID reader may transmit one or more narrowband RF signals that activate passive RFID tags within the field of the reader. The activated passive tag may switch its antennas, creating a backscatter reflection target that may then reflect a modulated narrowband signal.

In various examples, one or more proximity detection devices may include one or more wideband transceivers. The proximity detection devices may periodically, semi-periodically, or randomly (depending on the desired implementation) transmit a wideband RF signal (e.g., an outbound signal that may be referred to herein as a timing pulse signal). A responding device may respond to the wideband RF signal (e.g., through backscatter reflection and/or by generating a responding signal, depending on the type of responding device). The responding device may be an activated passive RFID tag (e.g., a passive tag activated by a narrowband RFID reader as described in further detail below) that may reflect the timing pulse signal via backscatter. In other examples, the responding device may be an active device, such as a data logger device that may activate an antenna and generate a wideband RF response signal in response to detection of some event (e.g., such as the data log indicating that a temperature threshold has been exceeded and that a timing pulse signal has been received from a proximity detection device).

The proximity detection devices may employ the one or more wideband transceivers to receive the reflected wideband signal from the tag (or wideband RF response signal generated by an active device) and may determine a time value, which may comprise time-of-flight or time-of-arrival data, for the received signal. Generally, a "response signal" may refer to a reflected wideband signal reflected from an RFID tag (e.g., a passive RFID tag) and/or to a wideband RF response signal generated by an active device in response to receipt of a timing pulse signal. In various examples, the time value may be compared to a threshold time value stored in non-transitory computer-readable memory of each proximity detection device. It should be appreciated that the time value threshold may be configurable to each proximity detection device such that each different proximity detection device may be tuned with a desired proximity. As such, different threshold values may be loaded into the non-transitory computer-readable memories of the proximity detection devices, as desired. When the time value is less than or equal to the time value threshold, the tag or active device is determined to be within the desired proximity, and one or more processors of the proximity detection device may trigger an output by a user interface component of the proximity detection device. The triggering of the output by the user interface component may include turning on a light source of the proximity detection device (e.g., a light emitting diode (LED) configured to output visible light), changing a color of the light source, emitting a sound, changing a periodicity of a sound being emitted by the proximity detection device (and/or of a flashing light of the proximity detection device), etc. In some examples, as the time value decreases (indicating that the distance traveled by the wideband signal between the remote object-of-interest and the proximity detection device is decreasing), the periodicity of the output of the user interface may also decrease (e.g., the light source may flash more frequently and/or the sound may be emitted more frequently and/or at an increasing or decreasing pitch).

In some examples, instead of (or in addition to) comparing the time value to a time value threshold, the proximity detection device may determine a distance between the proximity detection device and the remote device (e.g., the object-of-interest) using the known speed of the wideband signal and the time value associated with receiving the response (reflected/responding) signal. The distance may then be compared to a distance value threshold (in addition to, or instead of, comparing the time value to a time value threshold) stored in the non-transitory computer-readable memory of the proximity detection device. If the distance is less than the distance value threshold (and/or the time value is less than or equal to the time value threshold) the one or more processors of the proximity detection device may trigger the output by a user interface component of the proximity detection device, as described above. In various examples, the distance value threshold and/or time value threshold may be referred to generally as a "threshold value."

FIG. 1 is a diagram of an example proximity detection device 102, in accordance with various aspects of the present disclosure. The proximity detection device 102 is depicted with various components that may be included in a proximity detection device 102, although additional components, fewer components, and/or different components may be included in various implementations.

Proximity detection device 102 may comprise one or more processors, such as processor(s) 104, one or more memories, such as non-transitory computer-readable memory 103, one or more wideband transceivers, such as wideband transceiver 106, one or more power supplies, such as power supply 108 (e.g., a battery, a capacitor, a solar cell, and/or circuitry configured to store and/or provide power from an external power source), and one or more user interface components, such as user interface component(s) 120.

The wideband transceiver 106 may comprise one or more antennas, communication circuitry, and/or a clock configured to generate a clock signal. Processor(s) 104 may be, for example, a microprocessor that is configured to execute software instructions and/or other types of code portions for carrying out defined steps, some of which are discussed herein. Processor(s) 104 may communicate internally using, e.g., a data bus (or other data interconnect), which can be 16, 32, 64 or more bits wide (e.g., in parallel). The data bus or other coupling can be used to convey data, including program instructions, between processor(s) 104 and memory 103. Some processors 104 may have internal memory 103 and/or timing clocks.

Memory 103 may include one or more non-transitory storage media such as, for example, volatile and/or non-volatile memory that may be either fixed or removable. Memory 103 may be configured to store information, data, applications, instructions or the like for enabling proximity detection device 102 (and components thereof) to carry out various functions in accordance with the various examples described herein. For example, the memory 103 could be configured to buffer input data for processing by processor(s) 104. Additionally or alternatively, the memory could be configured to store instructions for execution by processor(s) 104. Memory 103 can be considered primary memory and be included in, for example, RAM or other forms of volatile storage which retain its contents only during operation, and/or memory 103 may be included in non-volatile storage, such as ROM, EPROM, EEPROM, FLASH, or other types of storage that retain the memory contents independent of the power state of the proximity detection device 102. Memory 103 could also be included in a secondary storage device, such as external disk storage, that stores large amounts of data. In some embodiments, the disk storage may communicate with processor(s) 104 using an input/output component via a bus or other routing component. The secondary memory may include a hard disk, compact disk, DVD, memory card, or any other type of mass storage type known to those skilled in the art.

In some examples, the wideband transceiver 106 may periodically, semi-periodically, and/or randomly transmit a timing pulse signal (e.g., transmitted wideband signal 152) and may listen for a response signal (e.g., response signal 154) responsive to the timing pulse signal (e.g., response signal 154, responsive to the transmitted wideband signal 152). In some examples, if a response signal is not received within a certain amount of time, the processor(s) 104 may control the wideband transceiver 106 to transmit another timing pulse signal (e.g., a transmitted signal). In various examples, responding device 130 may send a response signal (e.g., a reflection of the timing pulse signal transmitted by the wideband transceiver 106). The terms "response" and/or "responding" as used herein refer to both reflection of a timing pulse signal (e.g., by a passive RFID tag in a backscattering state) as well as a signal transmitted from an active tag that receives the timing pulse signal and transmits a wideband RF response signal. In some examples, the responding device 130 may be a passive RFID tag that has been selected to be in a backscattering state by a command from a narrowband RFID reader device (not shown in FIG. 1). In some other examples, responding device 130 may be a powered device comprising an RF transponder that is configured to respond to receipt of the timing pulse signal transmitted by the proximity detection device 102. For example, the responding device 130 may be a data logger device that may respond to a timing pulse signal received from one or more proximity detection devices 102 when a certain condition is met and/or a certain event has occurred (e.g., as determined using the data collected by the data logger device). In an embodiment, a data logger device would monitor temperature by measuring environmental temperature at periodic intervals, compare each measured environmental temperature to a threshold, and determine an out of bounds condition based on the comparison; when a data logger with out of bounds temperatures receives the timing pulse from a proximity detection device it would transmit a wideband RF response signal, while the data logger receiving the timing pulse without determined out of bounds temperatures would remain silent and not transmit a response signal. The proximity detection device 102 may comprise a clock (not shown in FIG. 1) to provide a clock signal for use in determining signal timing data, such as a time value associated with receipt of the reflected/response signal from the responding device 130. The value may indicate time-of-flight and/or time-of arrival.

The proximity device may determine a time value (e.g., a time-of-flight and/or time-of-arrival). The time value may represent a time between the transmission of the wideband signal (e.g., transmitted wideband signal 152) and the receipt of the response signal (e.g., response signal 154). In various examples, upon determining the time value associated with the receiving of a response signal responding to the timing pulse, the proximity detection device 102 may compare the time value to a threshold value 134 using logic circuitry. In various examples, the logic circuitry may comprise a processor 104 and the threshold value 134 may be stored in memory 103. However, in at least some other examples, the logic circuitry may use an application specific integrated circuit (ASIC) with or without a separate processor or processors. The ASIC may be used to determine the phase shift between the outgoing timing pulse signal and the response signal; the phase shift may be compared to a threshold value defined using discrete components in a time circuit; and/or other logic circuitry may be used instead of or in addition in order to determine whether or not to activate the user interface component(s) 120. In an example, the time circuit may comprise a capacitor and varistor or variable resistor, a diode, etc. Changing the adjustment of the variable resistor may allow the time threshold to be modified to set different distances for activation of the user interface component(s) 120. In some examples, the threshold value 134 may be a timing threshold and may be compared to the time value determined upon receipt of the response signal. In other examples, the threshold value 134 may be a distance threshold. In such cases, the time value determined upon receipt of the response signal from responding device 130 may be used together with a known speed of the wideband signal to determine a distance between the proximity detection device 102 and the responding device 130. This distance value may be compared to the distance threshold (e.g., threshold value 134). In some examples, threshold value 134 may be a combination of a timing threshold and a distance threshold. In such examples, the proximity detection device 102 may compare a determined time value and/or a determined distance value associated with receiving the response signal from responding device 130 to the threshold value 134. For example, a responding device 130 may be positioned distance d from a proximity detection device 102. The round trip time T for a timing pulse transmitted from the proximity device 102 to travel to the responding device 130, be processed by the responding device 130 and transmit a response signal, and for the response signal to return to the proximity detection device 102 may be characterized by the equation:

$$T = \frac{d}{c} + P + \frac{d}{c}$$

where P is the processing time for the responding device 130 and c is the speed at which the signals travel between the devices. Since P may be constant for a particular type of responding device 130, T varies linearly with d such that an appropriate threshold value 134 may be set for T, for d={T−P}c/2, or for {T−P} to allow the proximity detection device 102 to determine whether the user interface 120 should be activated in response to a signal received by the wideband transceiver 106.

If the time value and/or the distance value is less than or equal to the threshold value 134, processor(s) 104 may activate the user interface component(s) 120. In the example depicted in FIG. 1, the user interface component(s) 120 includes light(s) 110, a loudspeaker 112, and a display 114. However, the user interface component(s) 120 of a proximity detection device 102 may be some subset of these components or may be different, additional, or fewer components, depending on the desired implementation. For example, the user interface component(s) 120 may be an illumination source alone. Light(s) 110 may be Light emitting diodes (LED) configured to light up (e.g., in one or more different colors) when the user interface component(s) 120 are activated. The loudspeaker 112 may be configured to output sound (e.g., a chime, buzzer, music, etc.) when the user interface component(s) 120 are activated. Display 114 may be configured to display an image, indicator, color, etc., when the user interface component(s) 120 are activated. In addition, in some examples, the user interface may allow a user to modify the threshold value 134 to calibrate the sensitivity of the proximity detection device 102 and/or to adjust other parameters of the proximity detection device 102, such as via a touchscreen display, a manual switch, a variable resistor, a varistor, a dial, etc. In addition, the display 114 may optionally show remaining battery life (in cases where the power supply 108 is a battery).

The time value and/or the distance value being less than or equal to the threshold value 134 may indicate that the responding device 130 is proximate to (e.g., positioned nearby) the proximity detection device 102. Accordingly, the threshold value 134 may be tunable depending on the desired sensitivity of a given proximity detection device 102. The user interface component(s) 120 may be used to alert a user that an object-of-interest (e.g., a box with a passive RFID tag, where the passive RFID tag is the responding device 130) is close to the proximity detection device 102.

Different proximity detection devices 102 may be used to provide different cues to a user looking for an object-of-interest. For example, a first proximity detection device 102 may have a different threshold value 134 (e.g., a higher threshold value or lower threshold value) relative to a second proximity detection device 102. The first proximity detection device 102 may be affixed to a ceiling of a warehouse and may have a user interface component 120 that includes a bright spotlight. The second proximity detection device 102 may be adhered (e.g., via an adhesive or other mounting mechanism) to a shelf There may be an object-of-interest with an activated RFID tag on the shelf near the first proximity detection device 102 and the second proximity detection device 102. In this example, each of the first and second proximity detection devices 102 may transmit timing pulses (e.g., transmitted signals) and the activated RFID tag may reflect the respective timing pulses. The reflected signals may be received by each of the first and second proximity detection devices 102. The first and second proximity detection devices 102 may determine respective time values based on the receiving of the received response signals and may compare the time value (and/or a distance calculated therefrom) to respective threshold values 134. In this example, the threshold value for the overhead proximity detection device may be higher (or otherwise different) than the threshold value for the on-shelf proximity detection device. The time value (and/or the distance calculated therefrom) may be less than the respective threshold values 134 of the first and second proximity detection devices 102. Accordingly, in the example, the first proximity detection device 102 on the ceiling may activate its spotlight to illuminate the general area in which the object-of-interest is located. The second proximity detection device 102 on the shelf may flash an LED light or change a color of its LED light to inform a user of a more precise location of the object-of-interest. Accordingly, the spotlight first proximity detection device 102 may alert a user of the general vicinity (e.g., a particular bay door or particular area within a large warehouse) of the object-of-interest, while the second proximity detection device 102 may alert the user of a more precise location of the object-of-interest (e.g., once the user has approached the activated spotlight proximity detection device). Various additional details are described below in reference to the remaining figures.

Figure 2:
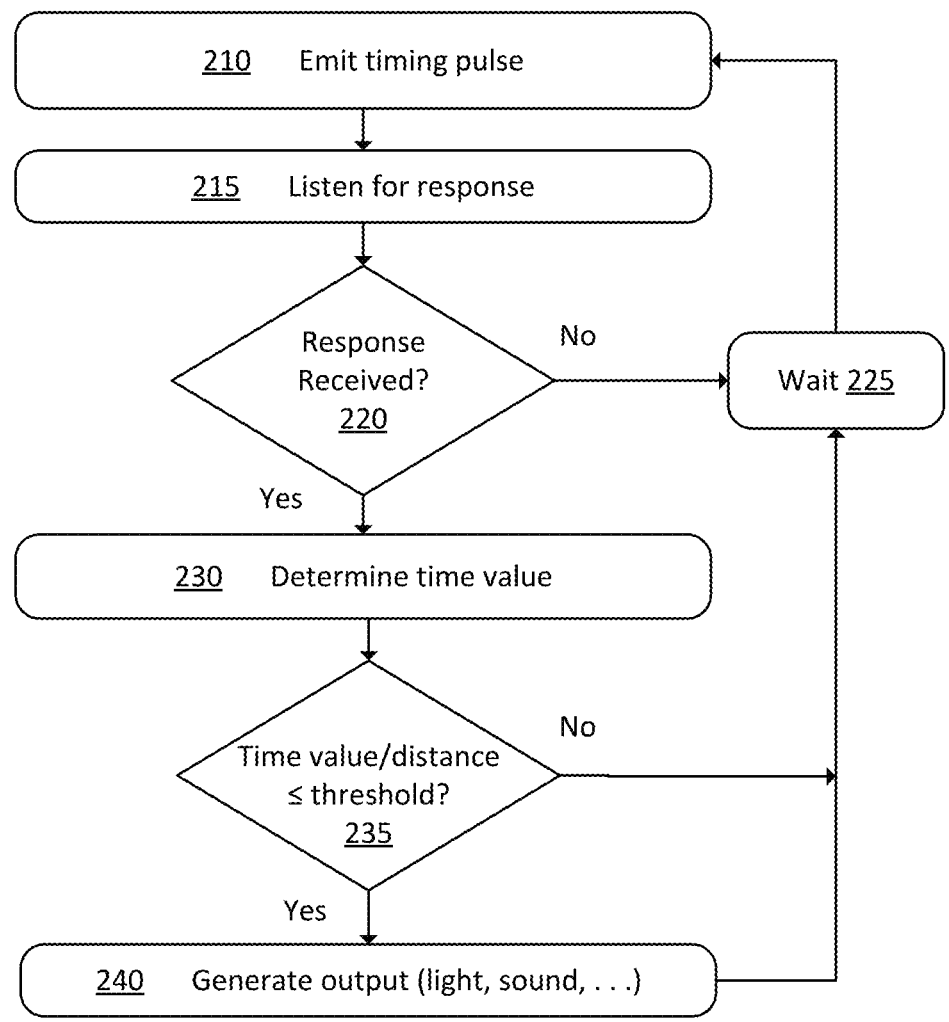
FIG. 2 is a flowchart of a method for using a proximity detection device, in accordance with various aspects of the present disclosure.

FIG. 2 is a flowchart of a process 200 for activating a proximity detection device, in accordance with various aspects of the present disclosure. In some examples, the various actions of FIG. 2 may be implemented by the one or more processor(s) 104, the wideband transceiver 106, and/or the user interface component(s) 120 of the proximity detection device 102 of FIG. 1. For example, instructions of a native instruction set architecture of the processor(s) 104 may be selected from memory 103 and may be executed to control the wideband transceiver 106 and/or the user interface component(s) 120 to perform the various actions of FIG. 2.

In various examples, processing may begin at action 210, at which a timing pulse signal may be transmitted. For example, the wideband transceiver 106 of the proximity detection device 102 may transmit a timing pulse signal (e.g., a wideband RF signal). Processing may continue at action 215, at which the wideband transceiver 106 may be powered to wait and listen for a response signal (e.g., a reflected signal or other wideband RF response signal).

At action 220, a determination may be made if a response signal (e.g., a return wideband RF signal) has been received. If not, the wideband transceiver 106 may wait a designated (or random) amount of time at action 225 before returning to action 210. If the wideband transceiver 106 receives a response signal the proximity detection device 102 may determine if the return signal was generated by a responding device (e.g., a passive RFID tag, a data logger, etc.). The wideband transceiver may recognize a received signal as being generated by an RFID tag, data logger device, or other responding device 130 based on data included in the response signal and/or by determining that the received signal has been perturbed in an expected fashion as a result of backscatter reflection, such as a change in polarity and/or based on the signal strength of the received reflected response signal. In some embodiments, an RFID reader may instruct a specific tag to respond during a time period when the wideband transceiver 106 is listening. In some embodiments, the wideband transceiver 106 may demodulate the return signal to retrieve the responding device's data. In some examples, if the proximity detection device 102 determines that the received signal was not generated by a designated responding device or device type, processing may proceed to action 225 and return to action 210.

At action 230, if the received signal is determined to have been generated by a responding device (rather than simply transmitted by another proximity detection device, for example), the proximity detection device 102 may determine a time value for the signal (e.g., the time-of-flight and/or time-of-arrival), such as by using a clock signal generated by a clock of the proximity detection device 102. If a time-of-flight is determined the proximity detection device 102 may optionally determine a distance value representing a distance between the proximity detection device 102 and the responding device 130 based on the time-of-flight and the speed of signal propagation. In some examples, at action 230, the time value may include a time-of-arrival of the return signal. The time-of-flight and time-of-arrival of the return signal may be used to determine a distance value representing the distance between the proximity detection device 102 and the responding device.

At action 235, the time value and/or the distance value determined using the time value may be compared to a threshold value 134 stored in memory 103 of the proximity detection device 102. If the time value and/or the distance value is less than or equal to the applicable threshold value(s), processing may proceed to action 240, at which an output may be generated by the user interface component(s) 120 of the proximity detection device 102. For example, a light source 110 of the proximity detection device 102 may be activated to emit light or change a color of emitted light. In another example, a loudspeaker 112 of the proximity detection device 102 may be activated to emit a sound, etc. If, at action 235, the time value and/or the distance value determined using the time value is greater than the applicable threshold value(s), processing may return to actions 225 and 210.

Figure 3:
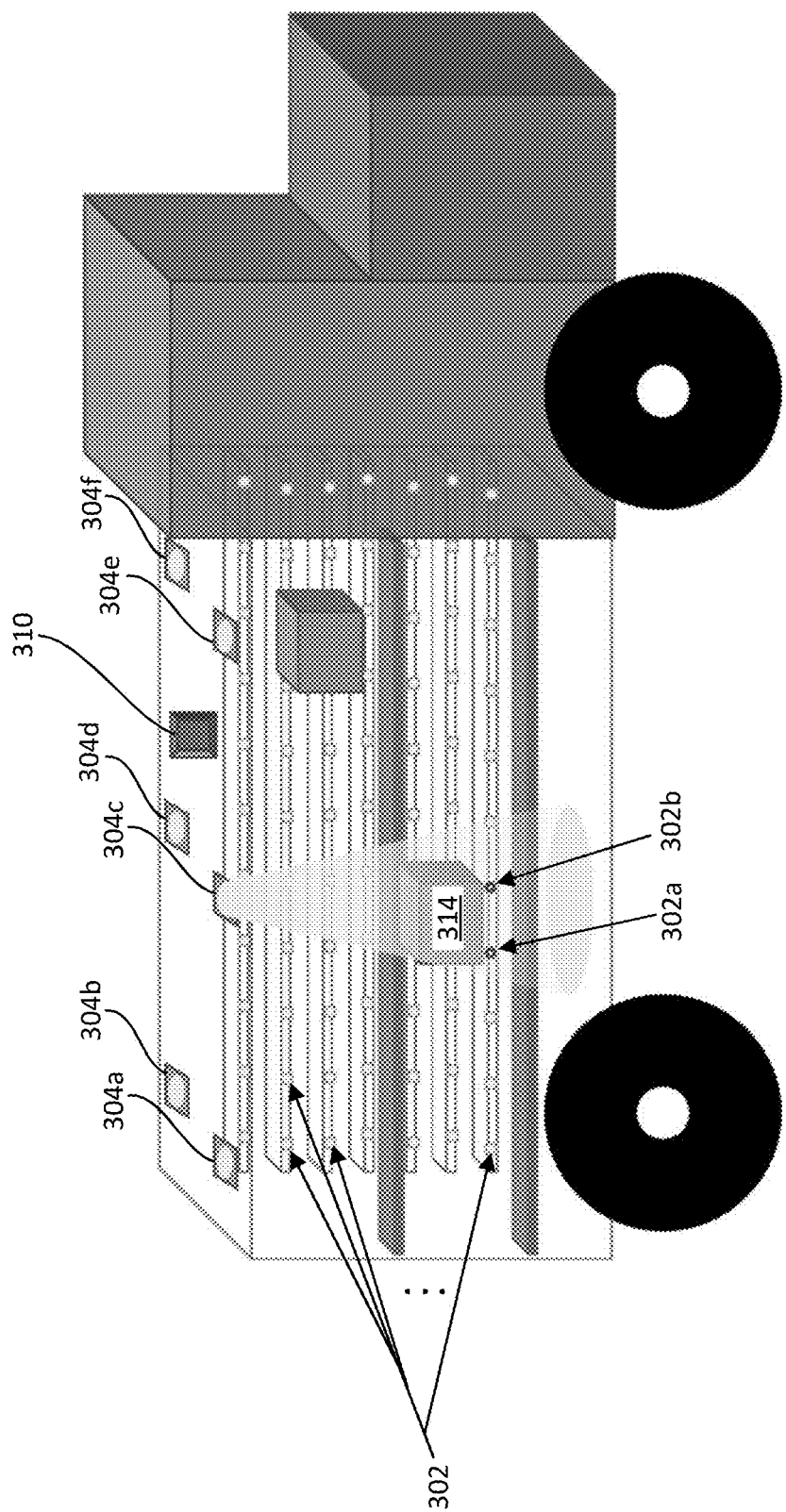
FIG. 3 is a diagram illustrating an example system that may use one or more proximity detection devices to detect the proximity of an object-of-interest, in accordance with various aspects of the present disclosure.

FIG. 3 is a diagram illustrating an example system that may use one or more proximity detection devices to detect the proximity of an object-of-interest, in accordance with various aspects of the present disclosure. FIG. 3 depicts an example in which proximity detection devices may be used to detect the proximity of a package of interest (e.g., on a delivery truck). In the example shown in FIG. 3, there may be two different types of proximity detection devices—an overhead proximity detection device 304 (including proximity detection devices 304a, 304b, 304c, 304d, 304e, and 304f) and an on-shelf proximity detection device 302 (including proximity detection devices 302a, 302b, etc.). The proximity detection devices 302 may be located on a shelf, on a bin, and/or at any other desired location. In an example, the overhead proximity detection devices 304 may be used to shine a spotlight down into an area of the truck when an object-of-interest is positioned close by. The proximity detection devices 302 may employ a smaller illumination source (e.g., a small LED light) to indicate a particular position on a shelf that is close to the object-of-interest. It should be appreciated that using a light source as the user interface component for the proximity detection devices 302, 304 is but one example of the types of user interface component that different proximity detection devices may use to draw a user's attention to the object-of-interest.

In the example of FIG. 3, the object-of-interest may be package 314. Package 314 may include a passive RFID tag. A narrowband RFID reader 310 may be positioned within the truck (or other environment). As described in further detail below, the narrowband RFID reader 310 may be used to selectively activate RFID tags that correspond to an object-of-interest, while muting other RFID tags (i.e., RFID tags corresponding to other objects that are not currently of interest). Once an RFID tag is selectively activated using the narrowband RFID reader 310 it may reflect timing pulse signals transmitted by the various proximity detection devices 302, 304. As described previously, the proximity detection devices 302, 304 may individually compute time values associated with the receipt of the reflected timing beacon signals and may compare the time value (and/or a distance value computed therefrom) to a time value threshold and/or a distance value threshold. If the time value (and/or distance value) is less than the relevant threshold value(s), the proximity detection devices 302, 304 may activate the user interface components (e.g., the light source in the example of FIG. 3).

For example, narrowband RFID reader 310 may include a communication interface (e.g., a Bluetooth interface, Wi-Fi interface, Zigbee interface). The narrowband RFID reader 310 may include a narrowband RF transceiver (for RF communication with RFID tags) in addition to, or instead of, any other communication interfaces. In some examples, the narrowband RFID reader 310 may be wired into power supply circuitry of the vehicle (or other venue in which the RFID reader 310 is installed). In other examples, the RFID reader 310 may be battery powered and/or may be wired into mains with a battery backup. Additionally, the RFID reader 310 may include one or more processor(s), a clock, one or more RFID antennas, communication circuitry, a user interface, and non-transitory computer-readable memory.

When a package needs to be found (e.g., when the delivery vehicle arrives at a site to which a package or other object is to be delivered), unique identifier data (a UID) associated with the RFID tag of that package may be sent to the narrowband RFID reader 310. In other examples, the package UIDs may be previously stored in memory of the RFID reader 310 and a user may query the memory for the set of UIDs associated with a particular delivery address or shipment code. The narrowband RFID reader 310 may transmit one or more narrowband RF signals to activate and interrogate passive RFID tags within the RF range of the narrowband RFID reader 310. In the example of FIG. 3, the range may encompass the storage area of the truck where packages are stowed for delivery. The narrowband RF signal (e.g., an interrogation signal) may activate the passive RFID tags on packages within the truck creating a backscatter reflection target. A modulated narrowband signal may be returned from each passive RFID tag as a result of the backscatter reflection. The modulated narrowband signal emitted by each of the activated passive RFID tags may include the UID of the tag.

At this point, the narrowband RFID reader 310 may be receiving modulated narrowband signals from each tag in the truck. In some examples, the RFID reader 310 may transmit instructions to the tags to respond only when prompted. For example, the tags may be instructed by the narrowband RFID reader 310 to select a random number (e.g., between 1 and 128) and to only respond to the narrowband signal from the RFID reader 310 with the modulated narrowband signal including the UID of the tag when the RFID reader 310 transmits the tag's randomly-selected number. If two tags respond to the same interrogation signal (e.g., due to the two tags having both randomly selected the same number), the RFID reader 310 may continually increase the size of the random number until no two tags respond in response to the same number. This procedure can enable the RFID reader 310 to uniquely communicate with each tag on the truck without interference from other tags.

The narrowband RFID reader 310 may send instructions to each tag, apart from the one or more tags on the object-of-interest, to turn off the reflecting state of the tag (e.g., by sending instructions to turn off a transistor in the tag and minimize backscatter by the tag's antenna). This may be referred to as "muting" the tags. Accordingly, only the targeted tag(s) (the tag on the object(s)-of-interest) are in a backscatter reflecting state. Each of the proximity detection devices 302, 304 in the truck is sending (periodically, semi-periodically, or randomly) wideband timing pulse signals. The targeted tag, which is in a backscatter reflecting state, reflects each of the wideband timing pulse signals, while other tags, which have been muted by the narrowband RFID reader 310 (as described above) may not reflect the timing pulse signals. Accordingly, each of the proximity detection devices 302, 304 may receive a response signal from the targeted tag and may determine a time value (representing a time between transmitting the wideband timing pulse signal and receiving the reflected response signal) and/or a distance value (determined using the time value and representing the distance between the individual proximity detection device and the reflecting tag), as described above in reference to FIG. 2. Each of the proximity detection devices 302, 304 may compare its time value/distance value to the applicable threshold values 134 (stored in memory 103 of the individual proximity detection devices) and may determine if the time value/distance value is less than or equal to the applicable threshold value. If, for a given proximity detection device, the determined time value/distance value is less than the applicable threshold value, the proximity detection device may activate a user interface component 120 (e.g., turn on a light source 110).

In the example in FIG. 3, the overhead proximity detection devices 304 may be configured with higher threshold values relative to the on-shelf proximity detection devices 302, as the overhead proximity detection devices 304 may be further away from packages on the truck relative to the on-shelf-proximity detection devices 302. In the example described in reference to FIG. 3, the delivery person may input the delivery location (which may be associated in memory with the UID of the RFID tag on the package to be delivered to that site), may directly input the UID of the RFID tag on the target package, or may otherwise determine the UID of the RFID tag on the target package for the current delivery address. The narrowband RFID reader 310 may selectively activate backscatter reflection for only the target tag (while muting other tags), as described above. Thereafter, the proximity detection devices 302, 304 may determine their distance to the target tag (or the time value that corresponds to the distance) and, if a proximity detection device is within the threshold distance (or threshold time value) of the target tag, the proximity detection device will activate its light source (or other user interface component).

In the example of FIG. 3, the package 314 is the object-of-interest. Accordingly, the on-shelf proximity detection devices 302a and 302b may light up, as the package 314 may be within the threshold distance associated with proximity detection devices 302a and 302b. Similarly, the overhead proximity detection device 304c may light up, as the package 314 may be within the threshold distance associated with proximity detection device 304c. The other proximity detection devices within the truck may not light up as the distance (and/or time value) between the RFID tag on the package 314 and these other proximity detection devices may exceed the threshold distance value (and/or threshold time value) associated with these other proximity detection devices.

In some examples, the one or more proximity detection devices 302, 304 may include clocks that may be synchronized with a system clock (or a clock of the narrowband RFID reader 310). In other examples, clock differentials may be known by a processor, to coordinate the data measurements. In such examples, the known location of the one or more wideband transceivers of the proximity detection devices and the time value for the reflected signal may be used to calculate a location measurement for the activated passive RFID tag.

In various examples, the proximity detection devices installed in a particular environment may be calibrated using an active beaconing device (e.g., a powered device that emits a response signal to the wideband timing pulse signals sent by the proximity detection devices). Thresholds may be set for each of the proximity detection devices such that only a desired number (e.g., 1, 2, 3, etc.) of closest proximity detection devices light up (or otherwise are activated) for a given position of the active beaconing device used for calibration.

Figure 4:
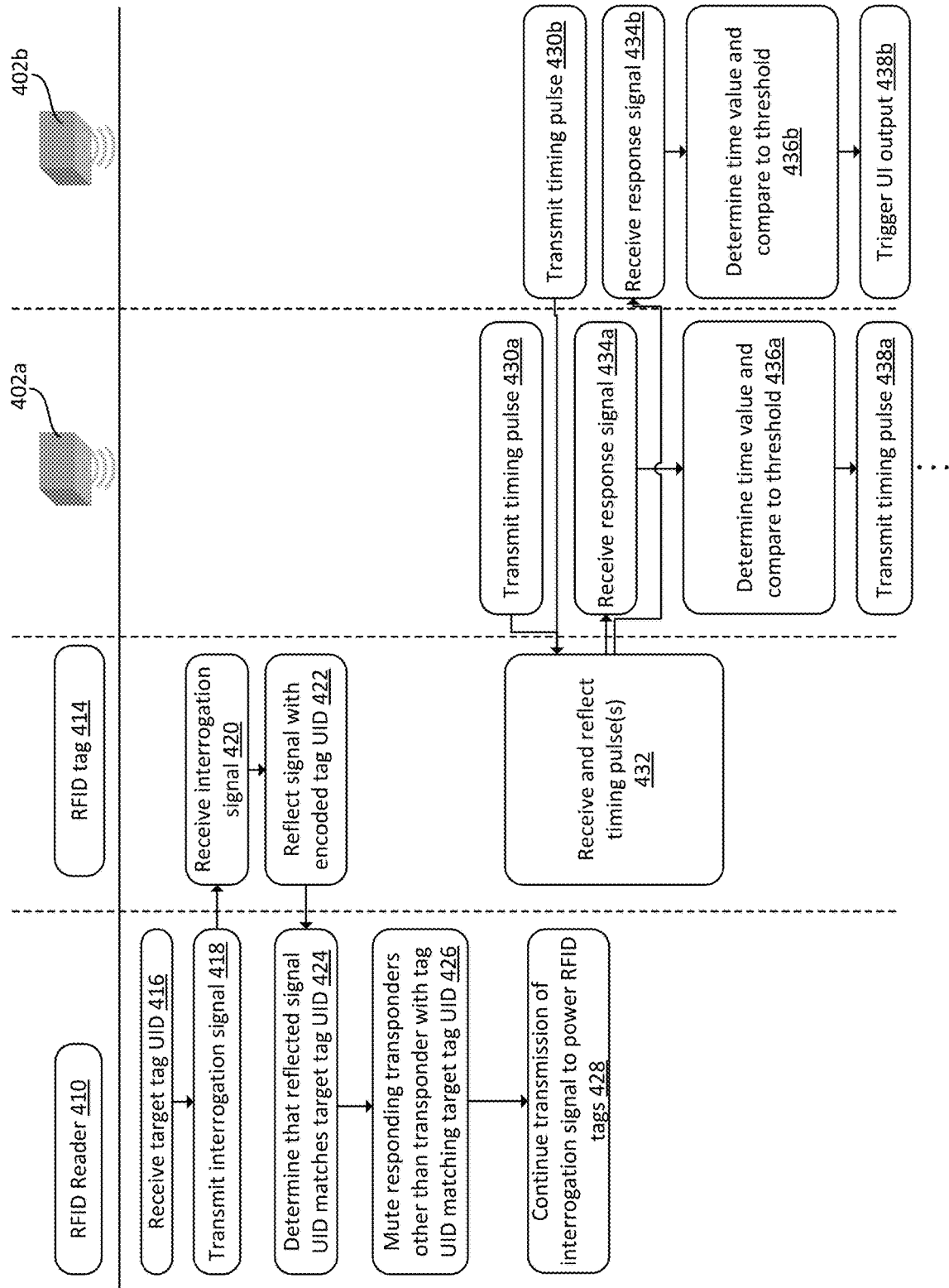
FIG. 4 is a flow diagram illustrating an example process for indicating the position of an object-of-interest using one or more of the proximity detection devices described herein, in accordance with various aspects of the present disclosure.

FIG. 4 is a flow diagram illustrating an example process for detecting the proximity of an object-of-interest using one or more of the proximity detection devices described herein. An RFID reader 410 that may include an interrogator and a receiver may receive a target tag UID at block 416. The target tag UID may be a passive RFID tag UID that a user wants to find using two or more proximity detection devices 402 (including proximity detection devices 402a, 402b). In the example of FIG. 4, the target tag may be RFID tag 414. The target tag UID may be received from a remote computing device such as a device associated with an inventory management system, a delivery system, warehouse execution software, a luggage tracking system, omnichannel fulfillment system, etc. At block 418, the RFID reader 410 may transmit an interrogation signal.

The RFID tag 414 may receive the interrogation signal at block 420. The received interrogation signal may be used to power a chip of the RFID tag 414 and may result in the RFID tag 414 reflecting a modulated response signal that is a reflection of the narrowband interrogation signal sent by the RFID reader 410. The reflected signal may include an encoded tag UID of the RFID tag 414 (block 422). At block 424, the RFID reader 410 may determine that the reflected signal UID matches the target tag UID. The RFID reader 410 may send instructions to each other responding passive RFID tag to switch off (e.g., mute) the reflecting state of the other RFID transponders apart from the transponder with a UID matching the target tag UID (block 426). The RFID reader 410 may continue to transmit the interrogation signal to power the RFID tags (including the target tag) at block 428. For example, the RFID reader 410 may continue to transmit the interrogation signal until a predetermined amount of time has elapsed or until an instruction is received to terminate the interrogation signal (e.g., from a proximity detection device or a computing device associated with inventory management, package delivery, etc.).

At block 430a, the proximity detection device 402a may transmit a timing pulse signal. As previously described, each proximity detection device 402a may periodically, semi-periodically, or randomly transmit timing pulse signals over time. Similarly, at block 430b, the proximity detection device 402a may transmit its own timing pulse signal. At block 432, the RFID tag 414 may receive and reflect (backscatter) the timing pulse signals from proximity detection devices 402a and 402b. In various examples, the response signal generated by the RFID tag 414 may be modulated to include a UID and/or other data identifying the response signal as being from an RFID tag. In an embodiment, the RFID tag 414 is an active RFID tag with data logger functionality configured to transmit a response signal comprising a UID associated with the active RFID tag. In an embodiment, the RFID tag 414 is a Gen2 compliant passive RFID tag configured to modulate a response comprising a UID stored in memory of the passive RFID tag in response to a command received from the RFID reader 410 but does not modulate the received timing pulse signal when reflecting it toward the proximity detection device.

At block 434a, the proximity detection device 402a may receive the response signal from the RFID tag 414. As previously described, in some examples, the proximity detection device may verify that the received response signal was received from an RFID tag, rather than another source, before further processing (e.g., using received signal strength, polarization, modulated data, and/or other characteristics of the received signal). At block 436a, the proximity detection device 402a may determine a time value based on the time between emitting the timing pulse signal and receiving the response signal. The time value may include a time-of-flight value or a time-of-arrival value. The time value (or a distance value determined using the time value) may be compared to a threshold value 134 at block 436a. The threshold value may be configured for proximity detection device 402a and may be stored in memory 103 of proximity detection device 402a. In the example of FIG. 4, the time value/distance value determined by proximity detection device 402a at block 436a may be greater than the relevant threshold value. Accordingly, processing may proceed to block 438a, at which the proximity detection device 402a transmits the next timing pulse signal (e.g., after waiting a predetermined or random amount of time).

Similarly, at block 434b, the proximity detection device 402b may receive the response signal from the RFID tag 414. As previously described, in some examples, the proximity detection device may verify that the received response signal arrived from an RFID tag rather than another source before further processing. At block 436b, the proximity detection device 402b may determine a time value based on the time between emitting the timing pulse signal and receiving the response signal. The time value may include a time-of-flight value or a time-of-arrival value. The time value (or a distance value determined using the time value) may be compared to a threshold value 134 at block 436b. The threshold value 134 may be configured for proximity detection device 402b and may be stored in memory 103 of proximity detection device 402b. In some examples, the threshold value 134 for proximity detection device 402a may be different from the threshold value 134 for proximity detection device 402b (while in other examples, the threshold values of proximity detection devices 402a, 402b may be the same). In the example of FIG. 4, the time value/distance value determined by proximity detection device 402b at block 436b may be less than the threshold value 134 for proximity detection device 402b. Accordingly, at block 438b, the proximity detection device 402b may trigger a UI output 120 (e.g., by turning on a light 110, emitting a sound from a loudspeaker 112, etc.). In the example of FIG. 4, if the threshold value 134 for proximity detection device 402a and proximity detection device 402b are the same, this indicates that the RFID tag 414 is closer to proximity detection device 402b than to proximity detection device 402a. Because the UI output of proximity detection device 402a is not triggered while the UI output of proximity detection device 402b is triggered, a user hoping to find the object associated with RFID tag 414 would search near proximity detection device 402b.

Figure 5:
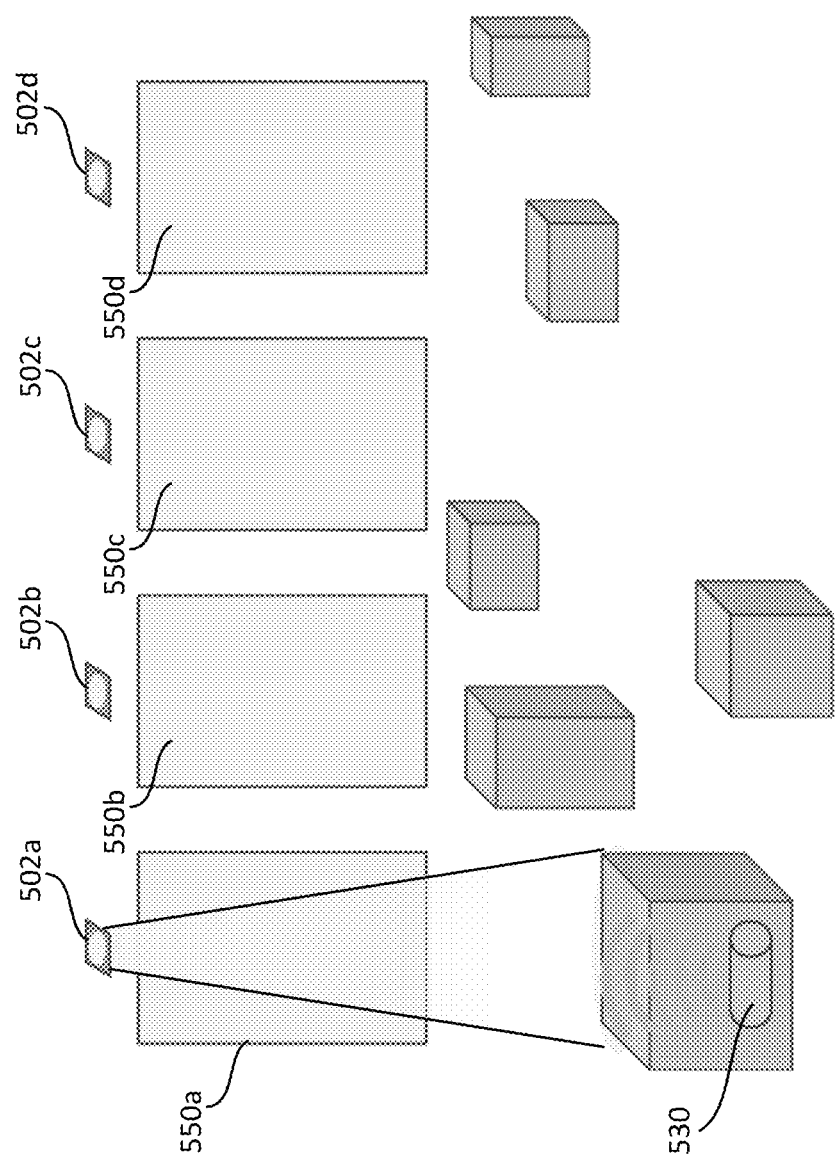
FIG. 5 is a diagram illustrating an example of proximity detection devices used with a powered responding device, in accordance with various aspects of the present disclosure.

FIG. 5 is a diagram illustrating an example of proximity detection devices used with a powered responding device 530, in accordance with various aspects of the present disclosure. In the example of FIG. 5, there may be a plurality of bay doors 550a, 550b, 550c, 550d (e.g., ingress and/or egress points) for an inbound or outbound package processing facility. It should be noted that this environment is merely an example and that the proximity detection devices described herein may be used in any desired context.

In the example of FIG. 5, there may be a powered responding device 530 (e.g., a data logger device). In this example, the powered responding device 530 may include a processor (e.g., a microprocessor), memory, and an RF transceiver. The processor may be configured to log data. For example, the package in or on which the powered responding device 530 is installed may include perishable goods (e.g., produce). The powered responding device 530 may monitor a temperature and may log current temperature conditions of the package (in this example, the powered responding device 530 may include a temperature sensor). If the temperature exceeds a high temperature threshold (indicating that the produce may spoil), the powered responding device 530 may activate the RF transceiver to listen for and respond to the timing pulse signal emitted by the proximity detection devices 502a, 502b, 502c, 502d, as described above. The response to a received timing pulse that is generated by powered responding device 530 (e.g., triggered by the temperature value and/or the occurrence of some designated and detected event) may include data and/or may include characteristics (e.g., received signal strength RSS or time of arrival data) indicating that the response signal is generated in response to the timing pulse signal generated by the proximity detection devices 502a, 502b, 502c, 502d such that the proximity detection devices 502a, 502b, 502c, 502d are able to differentiate the response signal from an incidental timing pulse signal received from the environment.

In this example, the powered responding device 530 may be within the threshold distance/threshold time value from proximity detection device 502a, but may be beyond the threshold distance/threshold time value from proximity detection devices 502b, 502c, 502d. As such, the proximity detection device 502a may activate a light source 110 and/or other user interface component(s) 120, while the light sources (or other user interface components) of proximity detection devices 502b, 502c, 502d may remain inactive. Proximity detection devices 502b, 502c, 502d may continue to transmit timing pulse signals. Additionally, in various examples, the powered responding device 530 may also include an alarm (e.g., a buzzer, light, etc.) to draw a user's attention to the particular box that needs attention. In this example, a user may have their attention drawn to the appropriate bay door 550a by the light/sound from proximity detection device 502a. The user may then locate the package with the powered responding device 530 that is in an alarm state (e.g., the powered responding device may generate an alarm signal or the user may simply find the package by barcode or some other means of identification) and may take remedial action. It should be noted that the foregoing example in which a data logger (e.g., the powered responding device 530) monitors temperature is but one of many examples. In general, a powered responding device 530 may include event detection logic that may be used to monitor for any desired state change and/or event and may be configured to respond to the timing pulse signals from the proximity detection devices in response to any such state changes and/or detected events. In an embodiment, the powered responding device 530 may also include a wireless communication interface, such as a Bluetooth or Wi-Fi radio, such that the powered responding device may transmit data (e.g. an address, an alert, a UID, a photograph of the object, etc.) to a hub or to a mobile computer associated with the user to assist the user in finding the particular box that needs attention.

Figure 6:
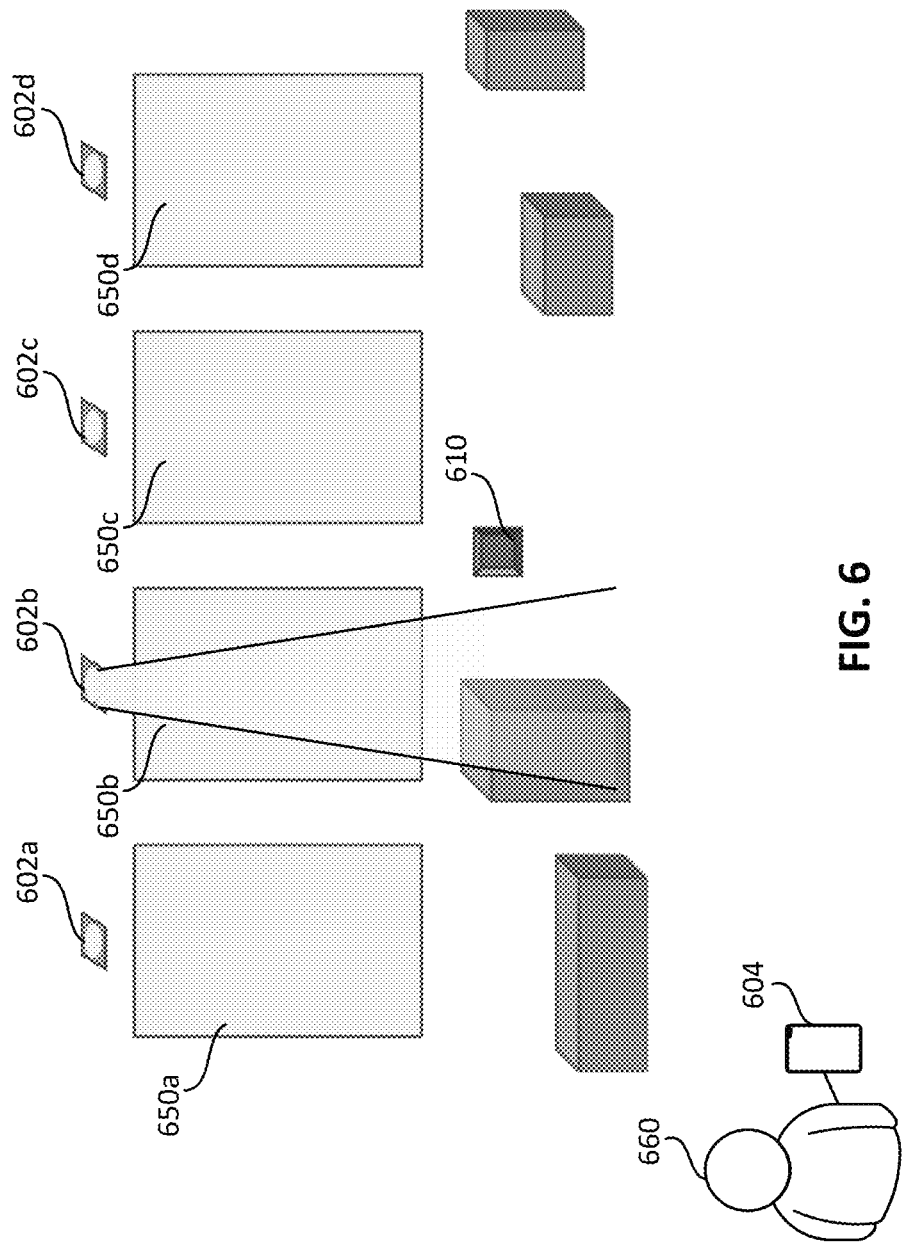
FIG. 6 is a diagram illustrating another example of proximity detection devices, including at least one mobile proximity detection device, in accordance with various aspects of the present disclosure.

FIG. 6 is a diagram illustrating another example of proximity detection devices, including at least one mobile proximity detection device, in accordance with various aspects of the present disclosure. Like the example depicted in FIG. 5, the example in FIG. 6 is shown in a package processing environment with bay doors 650a, 650b, 650c, and 650d. Proximity detection devices 602a, 602b, 602c, and 602d may be installed above and/or otherwise near each of the bay doors 650a, 650b, 650c, and 650d.

In the example of FIG. 6, there may be a narrowband RFID reader 610. One or more of the packages moving into and/or out of the bay doors 650a, 650b, 650c, and 650d may include passive RFID tags. Accordingly, the techniques previously described in reference to FIGS. 2-4 may be used to determine proximity of a particular tag or tags of interest by sending the UID of such tags to the narrowband RFID reader device 610 which may, in turn, singulate the population of tags then mute other tags apart from the tag or tags of interest such that only the tag or tags of interest reflect the timing beacon pulse signals from the proximity detection devices 602a, 602b, 602c, 602d. This may be useful in a variety of contexts. For example, there may be a particular class of packages that may be designated for expedited handling. In an embodiment, that class data may be stored on the RFID tags affixed to those packages. In an embodiment, the individual UIDs of the RFID tags affixed to those packages may be stored in a memory in association with the class ID and/or the expedited handling designation. Accordingly, the class data or the UIDs may be sent to the narrowband RFID reader 610 so that the reader may unmute all RFID tags of that class. At this point, whenever a package with an unmuted RFID tag comes close enough to one of the proximity detection devices 602a, 602b, 602c, 602d, it will reflect a received timing pulse signal as a response signal, such that the proximity detection device will receive the response signal, determine that the object is in close enough proximity, and turn on its user interface component (e.g., turn on its light source) enabling a user to easily locate the package and process it using the expedited handling procedures.

Additionally, in some examples, a user (e.g., user 660) may have access to a mobile proximity detection device 604 (e.g., a handheld proximity detection device and/or a proximity detection device integrated into a wearable component/device). In some examples, the user interface component of the mobile proximity detection device 604 may be configured to generate a Geiger-counter-like output whereby the mobile proximity detection device 604 emits the output light/sound more frequently as the distance between the mobile proximity detection device 604 and the RFID tag of interest becomes smaller and smaller. In other words, a period at which the user interface component of the mobile proximity detection device 604 emits output may decrease as the distance (and/or time value) between the mobile proximity detection device 604 and the target RFID tag decreases. Accordingly, the user 660 may be intuitively directed toward the package of interest based on the overhead proximity detection device 602b (the proximity detection device with the activated light source) and based on the increased cadence of the output of the mobile proximity detection device 604.

In some examples, the proximity detection devices described herein (e.g., proximity detection device 102, etc.) may be used in conjunction with a fixed location tag. A fixed location tag (FLT) refers to an RFID tag with a memory flag that may be set to indicate some information about the RFID tag. In some examples, this memory flag may be set to indicate that the FLT is stationary. Accordingly, in such examples, if the memory flag is set, indicating that the FLT is stationary, an RFID reader can locate the tag (or otherwise receive information regarding the location of the FLT) and can store the location in memory (e.g., RFID reader memory, server memory, RFID tag memory).

If an RFID reader detects a change in a signal received from an RFID tag, the RFID reader may typically interpret such a change as the RFID tag changing position and/or orientation. However, if the tag is a stationary FLT, the RFID reader may interpret the change in the signal as some other event unrelated to movement. In some examples, an FLT may include a physical button or other user interface component (e.g., a switch) that may allow a user to interface with the tag in a way that can be detected by an RFID reader.

Consider an example where FLTs are installed on different positions where objects are placed—such as shelves in a warehouse or on display racks in a clothing store. Additionally, there may be a proximity detection device associated with these positions (e.g., a proximity detection device installed over each clothing rack with a spotlight interface). A new object may be received (e.g., an article of clothing, a package, etc.) to be put away at a designated position (e.g., on a particular clothing rack, on a particular shelf, etc.). In this example, a user may scan the item (e.g., the clothing or package) with a barcode reader or RFID tag reader. The item identifier (e.g., a SKU) determined from the scan may be used to look up the appropriate display rack/shelf location. This display rack/shelf location may be associated with a particular FLT positioned nearby. Accordingly, the RFID reader may selectively power the FLT, as described above in reference to FIG. 3, for example. The FLT, in turn, may reflect the timing pulse signal (using backscatter reflection) emitted by the overhead proximity detection device and the overhead proximity detection device may turn on its spotlight. Accordingly, the spotlight may highlight the correct shelf/display rack where the item should be placed. Additionally, the user may then press the button on the FLT (or otherwise interact with an interface component of the FLT) to designate that the item has been placed. This information may be provided via the RFID reader to an inventory management system that may store the stowed location of the item in memory in association with its location, shelf, or display rack. Additionally, the button press may signal to the RFID reader to terminate transmission of the interrogation signal in order to discontinue the output by the proximity detection device (e.g., to turn off the spotlight of the overhead proximity detection device).

In another context where RFID tags are used on individual items, the RFID reader may be used to query items having the same item group (e.g., a particular garment type such as jeans or button-down shirts or a particular type/class of inventory component) as the item to be put away. This will cause these RFIDs to enter backscatter reflection mode and to reflect the timing pulse signals from nearby proximity detection devices. The closest proximity detection devices will be activated (e.g., they will activate their light sources, loudspeakers, etc.) so that the user's attention is drawn to the correct position where the item is to be put away (e.g., where other items of the same item type are already present).

Figure 7:
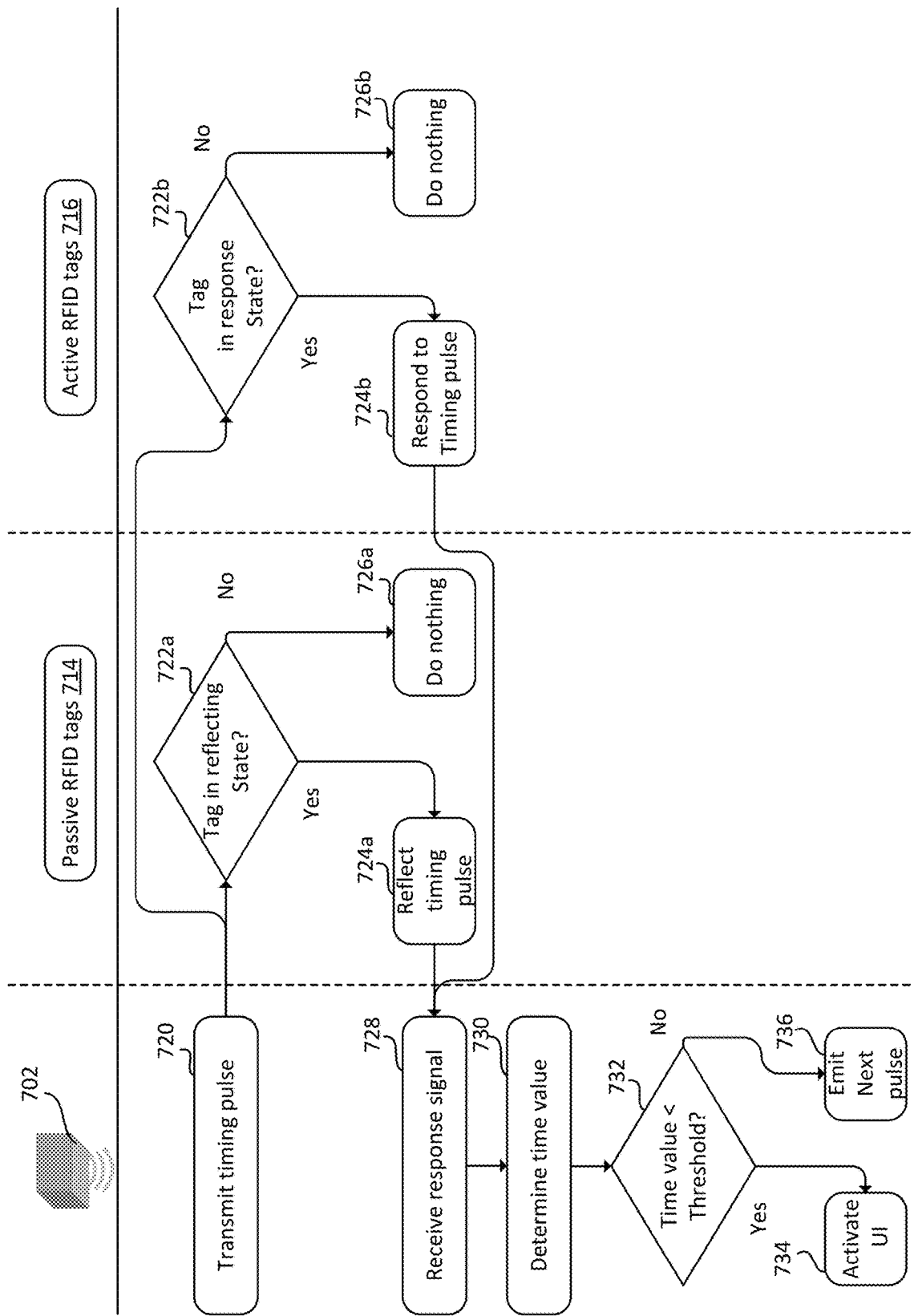
FIG. 7 is a flow diagram illustrating an example process for activating a user interface of a proximity detection device based on signals received from active and/or passive tags, in accordance with various aspects of the present disclosure.

FIG. 7 is a flow diagram illustrating an example process for activating a user interface of a proximity detection device based on signals received from active and/or passive tags, in accordance with various aspects of the present disclosure. A proximity detection device 702 may transmit timing pulse signals (block 720) as described above. Passive RFID tags 714 may receive the transmitted timing pulse. In some examples, passive RFID tags 714 may be in either a reflecting state (e.g., a backscattering state) or in a muted state (e.g., where the passive RFID tags 714 have been muted by an RFID reader (as described above) or where the passive RFID tags 714 are not in a powered state). At block 722a, a determination (for any passive RFID tag 714 receiving the timing pulse transmitted at block 720) may be made of whether the passive RFID tag 714 is in a reflecting state. If none of the passive RFID tags 714 receiving the timing pulse are in a reflecting state (either due to the passive RFID tags being muted or otherwise not being in a reflecting state), processing may proceed to block 726a (do nothing). Passive RFID tags 714 that are in a reflecting state may reflect the received timing pulse (block 724a) as a response signal.

Similarly, one or more Active RFID tags 716 may receive the transmitted timing pulse signal (transmitted at block 720). In some examples, active RFID tags 716 may be in a response state or a non-response state. For example, some triggering event (e.g., a temperature exceeding a temperature threshold) may cause one or more active RFID tags 716 to enter a response state. Conversely, if no triggering event is received, the active RFID tags 716 may be in a non-response state. Active RFID tags 716 that are in a non-response state may not respond to the timing pulse transmitted by proximity detection device 702 at block 720 (i.e., processing may proceed to block 726*b*—Do nothing). Conversely, active RFID tags 716 that are in a response state may receive the transmitted timing pulse (e.g., a wideband signal) and may transit a response signal (e.g., as an active tag wideband RF transmission) at block 724*b*.

When proximity detection device 702 receives a response signal (block 728), from one or more passive RFID tags 714, one or more active RFID tags, or both, proximity detection device 702 may determine a time value (block 730) associated with the received response signal (e.g., the time-of-flight and/or time-of-arrival). If a time-of-flight is determined the proximity detection device 702 it may optionally determine a distance value representing a distance between the proximity detection device 702 and the responding device based on the time-of-flight and the speed of signal propagation. In some examples, at block 730, the time value may include a time-of-arrival of the return signal. The time-of-flight and time-of-arrival of the return signal may be used to determine a distance value representing the distance between the proximity detection device 702 and the responding device.

At block 732, the time value and/or the distance value determined using the time value may be compared to a threshold value 134 stored in memory 103 of the proximity detection device 702. If the time value and/or the distance value is less than or equal to the applicable threshold value(s), processing may proceed to block 734, at which an output may be generated by the user interface component(s) (e.g., a light source) of the proximity detection device 702. For example, a light source 110 of the proximity detection device 702 may be activated to emit light or change a color of emitted light. In another example, a loudspeaker 112 of the proximity detection device 702 may be activated to emit a sound, etc. If, at block 732, the time value and/or the distance value determined using the time value is greater than the applicable threshold value(s), the proximity detection device 702 may emit the next timing pulse (block 736).

Aspects of the subject matter described herein may be useful alone or in combination with one or more other aspects described herein. In a 1st example aspect of the present disclosure, a system to indicate the position of a wireless tag to a user comprises: a first device configured to receive a first response signal from the wireless tag via a first radio receiver determine a time value associated with the receiving of the first response signal, compare the time value to a threshold value, and activate a first user interface based on the comparison; and a second device configured to activate a second user interface in response to receiving a second response signal from the wireless tag via a second radio receiver.

In accordance with a 2nd example aspect of the present disclosure, which may be used in combination with any one or more of the other aspects described herein (e.g., the 1st aspect), the first user interface is a light configured to project visible light in a first direction generally orthogonal to a first plane, the second user interface is a light configured to project visible light in a second direction generally orthogonal to a second plane, and the first plane is orthogonal to the second plane.

In accordance with a $3^{rd}$ example aspect of the present disclosure, which may be used in combination with any one or more of the other aspects described herein (e.g., the 1st aspect or the 2nd aspect), the threshold value is associated with an expected distance between the first plane and the wireless tag.

In accordance with a 4th example aspect of the present disclosure, which may be used in combination with any one or more of the other aspects described herein (e.g., the 1st aspect or the 2nd aspect), the first plane is generally horizontal.

In accordance with a 5th example aspect of the present disclosure, which may be used in combination with any one or more of the other aspects described herein (e.g., the 1st aspect) the first response signal is received at the second radio receiver as the second response signal.

In accordance with a 6th example aspect of the present disclosure, which may be used in combination with any one or more of the other aspects described herein (e.g., the 1st aspect) the first device is further configured to transmit a timing pulse signal and the second response signal is a reflection of the timing pulse signal from the wireless tag.

In accordance with a 7th example aspect of the present disclosure, which may be used in combination with any one or more of the other aspects described herein (e.g., the 1st aspect), the first device is further configured to transmit a first timing pulse signal, the first response signal is a reflection of the first timing pulse signal from the wireless tag, and the time value is further associated with the transmission of the first timing pulse signal; and the second device is further configured to transmit a second timing pulse signal, and the second response signal is a reflection of the second timing pulse signal from the wireless tag.

In accordance with a 8th example aspect of the present disclosure, which may be used in combination with any one or more of the other aspects described herein (e.g., the 1st aspect), the first device is in a fixed position, and the second device is mobile with respect to the fixed position In accordance with a 9th example aspect of the present disclosure, which may be used in combination with any one or more of the other aspects described herein (e.g., the 8th aspect), a period at which the second user interface component emits output decreases based on characteristics of the received second response signal.

In accordance with a 10th example aspect of the present disclosure, which may be used in combination with any one or more of the other aspects described herein (e.g., the 1st aspect), the first device is further configured to transmit a first timing pulse signal, the first response signal is a reflection of the first timing pulse signal from the wireless tag, and the time value is further associated with the transmission of the first timing pulse signal; and the second response signal is a reflection of a second timing pulse signal from the wireless tag, and the second device is further configured to: transmit the second timing pulse signal, determine a second time value associated with the receiving of the second response signal, compare the second time value to a second threshold value, and activating the second user interface is based on the comparison of the second time value to the second threshold value.

In accordance with a 11th example aspect of the present disclosure, which may be used in combination with any one or more of the other aspects described herein (e.g., the 10th aspect), the first threshold value is different than the second threshold value.

In accordance with a 12th example aspect of the present disclosure, which may be used in combination with any one or more of the other aspects described herein (e.g., the 10th aspect), the first threshold value is the same as the second threshold value.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
   a first device comprising:
      a first processor;
      a first radio frequency transceiver; and
      a first user interface component;
      wherein the first radio frequency transceiver is configured to:
         transmit a first signal; and
         receive a second signal from a remote device in response to the first signal;
      wherein the first processor is configured to:
         determine a first time value associated with the receiving of the second signal;
         determine that at least one of the first time value or a first distance value determined using the first time value is less than or equal to a first threshold value, wherein the first threshold value is associated with the first device;
         trigger a first output by the first user interface component based on at least one of the first time value or the first distance value being less than or equal to the first threshold value;
   a second device comprising:
      a second processor;
      a second radio frequency transceiver; and
      a second user interface component;
      wherein the second radio frequency transceiver is configured to:
         transmit a third signal; and
         receive a fourth signal from the remote device in response to the third signal;
      wherein the second processor is configured to:
         determine a second time value associated with the receiving of the fourth signal;

determine that at least one of the second time value or a second distance value determined using the second time value is greater than a second threshold value, wherein the second threshold value is associated with the second device; and cause the second radio frequency transceiver to transmit a fifth signal.

2. The system of claim 1, wherein:

the first threshold value associated with the first device is loaded into a first non-transitory computer-readable memory of the first device;

the second threshold value associated with the second device is loaded into a second non-transitory computer-readable memory of the second device; and the first threshold value is different than the second threshold value.

3. The system of claim 1, wherein:

the remote device comprises a passive radio frequency identification (RFID) tag;

the passive RFID tag is powered by a sixth signal from an RFID reader device; and the second signal is reflected by the passive RFID tag in response to receipt by the passive RFID tag of the first signal.

* * * * *